United States Patent
Isokawa (10) Patent No.: US 10,659,622 B2
(45) Date of Patent: May 19, 2020

(54) IMAGE FORMING APPARATUS

(71) Applicant: KONICA MINOLTA, INC., Chiyoda-ku, Tokyo (JP)

(72) Inventor: Hiroshi Isokawa, Hino (JP)

(73) Assignee: KONICA MINOLTA, INC., Tokyo (JP)

(*) Notice: Subject to any disclaimer, the term of this patent is extended or adjusted under 35 U.S.C. 154(b) by 0 days.

(21) Appl. No.: 16/283,761

(22) Filed: Feb. 23, 2019

(65) Prior Publication Data

US 2019/0312982 A1 Oct. 10, 2019

(30) Foreign Application Priority Data

Apr. 10, 2018 (JP) ................................ 2018-075433

(51) Int. Cl.
*H04N 1/00* (2006.01)
*H04N 1/60* (2006.01)

(52) U.S. Cl.
CPC ..... *H04N 1/00005* (2013.01); *H04N 1/00047* (2013.01); *H04N 1/00058* (2013.01); *H04N 1/00599* (2013.01); *H04N 1/00652* (2013.01); *H04N 1/603* (2013.01)

(58) Field of Classification Search
CPC ............. G03G 15/607; G03G 15/0848; G03G 15/0853; G03G 2215/0634; H04N 1/00681; H04N 1/00745; H04N 1/00588; H04N 1/00551; H04N 1/00702; H04N 1/00732; H04N 1/00002; H04N 1/00013; H04N 1/00018; H04N 1/00034; H04N 1/00045; H04N 1/00092; H04N 1/00687; H04N 1/00721; H04N 1/12; H04N 2201/03104; H04N 1/0032; H04N 1/00411; H04N 1/0066; H04N 1/0071; H04N 1/00718; H04N 1/00737; H04N 1/00774; H04N 1/00779; H04N 1/00957; H04N 1/32561; H04N 1/32593; H04N 1/3878; H04N 1/40; H04N 2201/0094
USPC ....... 358/498, 474, 488, 497, 296, 406, 461, 358/475, 486, 496; 399/370, 63, 258, 30, 399/376, 386, 389; 271/10.03, 9.06
See application file for complete search history.

(56) References Cited

U.S. PATENT DOCUMENTS

| 5,548,379 | A * | 8/1996 | Fukuchi | G03G 15/01 399/116 |
|---|---|---|---|---|
| 6,336,007 | B1 * | 1/2002 | Sugisaki | B41J 29/38 399/11 |
| 7,346,206 | B2 * | 3/2008 | Hill | H04N 1/00681 250/234 |
| 8,760,678 | B2 * | 6/2014 | Umi | H04N 1/32657 271/121 |
| 10,088,783 | B2 * | 10/2018 | Fukai | G03G 15/2028 |
| 2003/0090056 | A1 * | 5/2003 | Fang | B65H 7/06 271/226 |
| 2004/0253030 | A1 * | 12/2004 | Hamada | H04N 1/00567 399/367 |

(Continued)

FOREIGN PATENT DOCUMENTS

JP 2013103407 A 5/2013

*Primary Examiner* — Negussie Worku
(74) *Attorney, Agent, or Firm* — Holtz, Holtz & Volek PC (57) ABSTRACT

An image forming apparatus, includes: an image former that forms an image on a sheet; an inspector that inspects an object; and a feed path that conveys the object to the inspector, wherein the feed path is installed to bypass the image former.

12 Claims, 4 Drawing Sheets

(56) References Cited

U.S. PATENT DOCUMENTS

| | | | | |
|---|---|---|---|---|
| 2007/0250714 A1* | 10/2007 | Kawada | ............ | H04N 1/32101 |
| | | | | 713/175 |
| 2008/0219543 A1* | 9/2008 | Csulits | .................. | G06K 9/033 |
| | | | | 382/135 |
| 2012/0314267 A1* | 12/2012 | Suzuki | ................ | G03G 15/607 |
| | | | | 358/498 |
| 2013/0235396 A1* | 9/2013 | Hyoki | ..................... | H04N 1/38 |
| | | | | 358/1.9 |
| 2015/0220053 A1* | 8/2015 | Yamauchi | .............. | G03G 21/20 |
| | | | | 399/94 |
| 2015/0326743 A1* | 11/2015 | Yabuuchi | .......... | H04N 1/00708 |
| | | | | 358/498 |
| 2015/0358489 A1* | 12/2015 | Isokawa | ............ | H04N 1/00087 |
| | | | | 358/474 |
| 2016/0347563 A1* | 12/2016 | Takuwa | .................. | B65H 7/20 |
| 2016/0366296 A1* | 12/2016 | Isokawa | ............ | H04N 1/00724 |
| 2017/0090384 A1* | 3/2017 | Muto | ................ | G03G 15/6529 |
| 2017/0094126 A1* | 3/2017 | Isokawa | ............ | H04N 1/00018 |
| 2017/0308021 A1* | 10/2017 | Kato | ...................... | B65H 85/00 |
| 2018/0084145 A1* | 3/2018 | Isokawa | ............... | G03G 15/228 |
| 2018/0183968 A1* | 6/2018 | Furukawa | ............ | H04N 1/3263 |
| 2018/0270386 A1* | 9/2018 | Isokawa | ............ | H04N 1/02895 |
| 2019/0098164 A1* | 3/2019 | Kurosawa | ............ | H04N 1/0443 |
| 2019/0129342 A1* | 5/2019 | Ikeda | ................. | G03G 15/5062 |
| 2019/0139220 A1* | 5/2019 | Akiyama | ............... | G06T 7/0014 |
| 2019/0238703 A1* | 8/2019 | Seki | ................... | H04N 1/00726 |

\* cited by examiner

IMAGE FORMING APPARATUS

The entire disclosure of Japanese patent Application No. 2018-075433, filed on Apr. 10, 2018, is incorporated herein by reference in its entirety.

BACKGROUND

Technological Field

The present disclosure relates to an image forming apparatus.

Description of the Related Art

A technique of scanning an image to be printed on a sheet conveyed from an image forming apparatus main body and performing an inspection process of inspecting a quality of an image has been proposed (for example, see JP 2013-103407A).

However, in the technique of the related art disclosed in JP 2013-103407A, the image formed on the sheet conveyed via an image forming path of the image forming apparatus main body is inspected. The image forming path includes a step of transferring a toner image onto the sheet. Therefore, in the related art, even when a printed material on which an image is formed in a part other than the image forming apparatus main body is inspected, since it is inspected after passing through the image forming path, an image printed on the printed material is likely to get dirty. In other words, in the technique of the related art, although it is possible to inspect the printed material, the quality of the printed material is unlikely to be able to be maintained.

SUMMARY

The present disclosure was made in light of the foregoing, and proposes a technique of performing an inspection while maintaining the quality of a printed material.

To achieve the abovementioned object, according to an aspect of the present invention, an image forming apparatus reflecting one aspect of the present invention comprises: an image former that forms an image on a sheet; an inspector that inspects an object; and a feed path that conveys the object to the inspector, wherein the feed path is installed to bypass the image former.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

Figure 1:
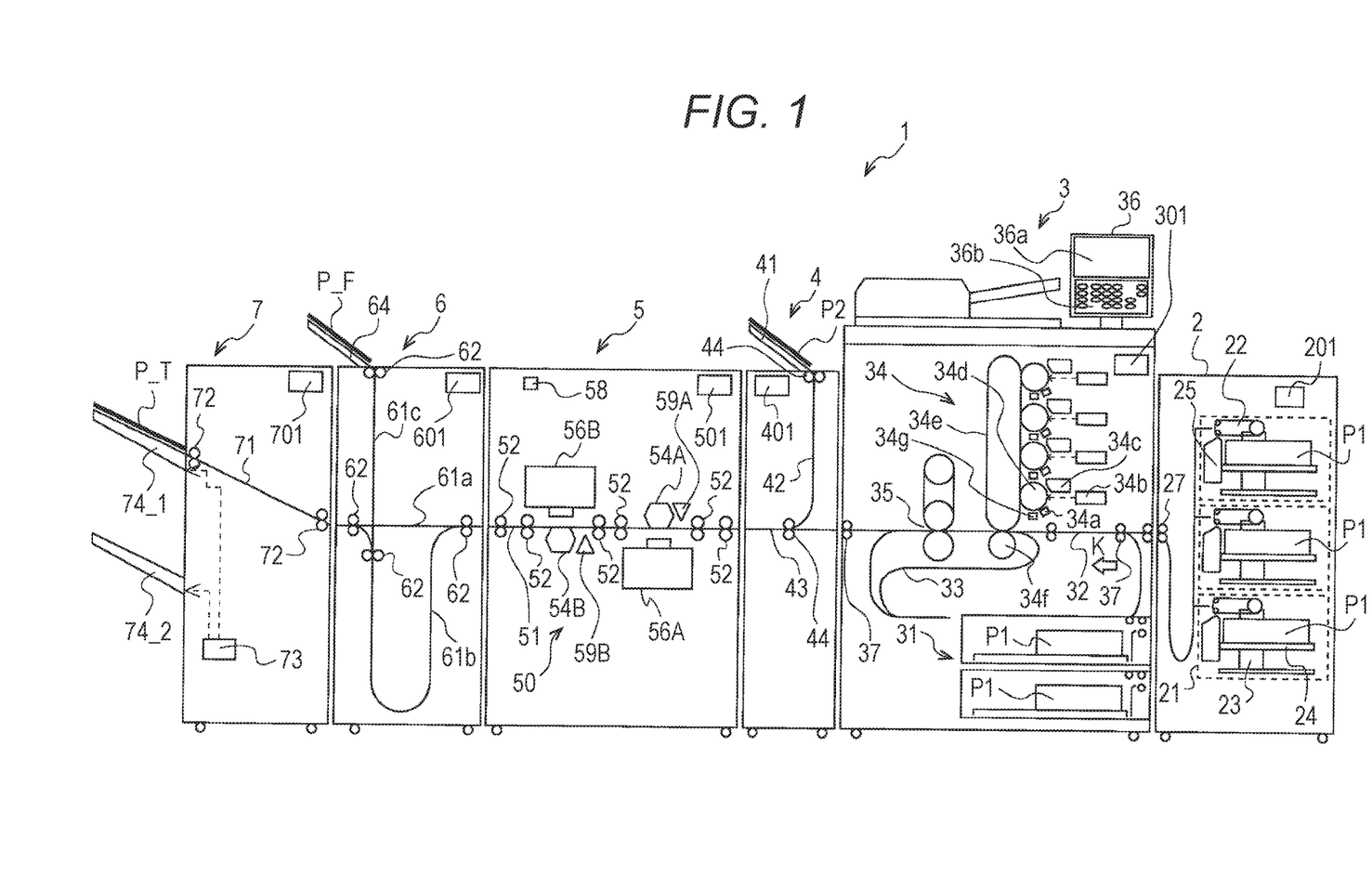
FIG. 1 is a diagram illustrating an example of an overall configuration of an image forming apparatus according to an embodiment of the present disclosure.

FIG. 1 is a diagram illustrating an overall configuration example of an image forming apparatus 1 according to an embodiment of the present disclosure. The image forming apparatus 1 includes a feeding apparatus 2, an image forming apparatus main body 3, a paper inserter 4, an image scanning apparatus 5, a discharging apparatus 6, and a discharging apparatus 7. The image forming apparatus main body 3 includes at least an image former 34 which will be described later in detail. In other words, the image forming apparatus 1 includes the image former 34. The feeding apparatus 2 is arranged in a front stage side of the image forming apparatus main body 3. The paper inserter 4, the image scanning apparatus 5, the discharging apparatus 6, and the discharging apparatus 7 are arranged in a rear stage side of the image forming apparatus main body 3. The paper inserter 4 includes at least a feed path 42 which will be described in detail later. The image scanning apparatus 5 has at least an inspector 50 which will be described in detail later. The inspector 50 inspects a sheet P1 conveyed from the image former 34 or a printed material P2 conveyed from the feed path 42. The sheet P1 or the printed material P2 is an object to be inspected by the inspector 50.

The feeding apparatus 2 separates the sheet P1 for each sheet and discharges it. The sheet P1 discharged from the feeding apparatus 2 is conveyed to the image forming apparatus main body 3. Specifically, in the feeding apparatus 2, three sheet storages 21 are installed in a vertical direction, for example. A suction unit 22 is arranged above each of the sheet storages 21. A side guide 23 is arranged on both sides of each of the sheet storages 21. A platform 24 is arranged between the side guides 23. The sheet P1 is placed on the platform 24. The side guide 23 blows side air onto the sheet P1 while holding the sheet P1 stacked on the platform 24 in a width direction. An air blower 25 is arranged at a leading end side of the sheet P1 stacked on the platform 24. The air blower 25 blows separation air onto the sheet P1. The suction unit 22 is arranged above the platform 24 and suctions the sheet P1 in order from the top. The sheet P1 suctioned by the suction unit 22 is conveyed to the image forming apparatus main body 3 through a conveying roller 27. A controller 201 includes a CPU, a ROM, a RAM, an I/O interface, and the like (not illustrated). The CPU reads a program from the ROM in accordance with processing content, develops the program onto the RAM, and control an operation of the feeding apparatus 2 in cooperation with the developed program.

The image forming apparatus main body 3 includes the image former 34 that forms an image on the sheet P1 placed on a sheet feeder 31. The image forming apparatus main body 3 includes a setting unit 36 in an upper portion. The setting unit 36 includes a display 36a and an operating unit 36b, and receives an operation of a user via the operating unit 36b and displays information using the display 36a, and for example, the setting unit 36 receives an operation to perform an inspection process and displays an inspection result. An automatic document feeding apparatus that automatically reads an original and an original image scanning apparatus are installed above the image forming apparatus main body 3. The original image scanning apparatus can read an image via a platen glass. For example, the original image scanning apparatus is used to read an image of an original and form an image through the image former 34. The image former 34 is installed on a conveyance path 32. If the sheet P1 placed on the sheet feeder 31 is fed out, the sheet P is conveyed toward the image former 34 in a conveyance direction K along the conveyance path 32 through a conveying roller 37. The image former 34 includes photosensitive elements 34d which are prepared for respective colors such as cyan, magenta, yellow, and black, and a charging apparatus 34a, an exposure apparatus 34b, and a developing apparatus 34c are installed around each of the photosensitive element 34d.

On the surface of the photosensitive element 34d charged by the charging apparatus 34a, exposure of an image is performed by the exposure apparatus 34b on the basis of original image data of a print job, and an electrostatic latent image is performed. The electrostatic latent image is developed by the developing apparatus 34c and becomes a toner image. The toner image is transferred onto an intermediate transfer belt 34e. The toner image transferred onto the intermediate transfer belt 34e is pressed by a secondary transfer roller 34f and transferred onto the sheet P1. The toner image which is pressed and transferred by the secondary transfer roller 34f is heated and pressed by a fixer 35 and fixed onto the sheet P1, so that an image is formed on the sheet P1 in the image forming apparatus main body 3. In other words, the image former 34 causing the image to be transferred onto the sheet P1 by forming image forming by an electrophotographic process. A drum cleaning apparatus 34g is installed nearby the photosensitive element 34d. The drum cleaning apparatus 34g removes residual toner remaining on the intermediate transfer belt 34c. Further, in a case in which an image is formed on both sides, the sheet P1 with an image formed on one side thereof is conveyed via a circulation path 33 and conveyed again to the image former 34, and then an image can be formed on the other side. A controller 301 includes a CPU, a ROM, a RAM, an I/O interface, and the like (not illustrated). The CPU reads a program from the ROM in accordance with processing content, develops the program onto the RAM, and controls an operation of the image forming apparatus main body 3 in cooperation with the developed program.

The paper inserter 4 is arranged on the rear stage side of the image forming apparatus main body 3 and on the front stage side of the image scanning apparatus 5 and can feed the printed material P2 placed on a sheet feed tray 41 to image scanning apparatus 5 without passing through the image forming apparatus main body 3. The paper inserter 4 includes the sheet feed tray 41 in an upper portion, and includes a feed path 42, a conveyance path 43, a conveying roller 44, and a controller 401 therein. The feed path 42 is formed to bypass the image former 34 and conveys the printed material P2 placed on the sheet feed tray 41 to the conveyance path 43 by the conveying roller 44. The controller 401 includes a CPU, a ROM, a RAM, an I/O interface, and the like (not illustrated). The CPU reads a program from the ROM in accordance with processing content, develops the program onto the RAM, and controls an operation of the paper inserter 4 in cooperation with the developed program.

The image scanning apparatus 5 includes the inspector 50, a conveyance path 51, a conveying roller 52, a first temperature detector 58, a second temperature detector 59A, a second temperature detector 59B, and a controller 501. The inspector 50 includes a background member 54A, a background member 54B, a first scanner 56A, and a second scanner 56B. The background member 54A and the background member 54B are referred to collectively as a background member 54. The first scanner 56A and the second scanner 56B are referred to collectively as a scanner part 56. The second temperature detector 59A and the second temperature detector 59B are referred to collectively as a second temperature detector 59. The conveyance path 51 is a path which the sheet P1 or the printed material P2 passes through. The conveying roller 52 conveys the sheet P1 or the printed material P2. The first scanner 56A is arranged at a position to scan the back side of the sheet P1 or the printed material P2, and scans a back surface image of an object. For example, a scanning result of the first scanner 56A may be used for checking a deviation of an image formed on the sheet P1 or an image printed on the printed material P2, the presence or absence of an unexpected image, or the like. On the other hand, the second scanner 56B is arranged at a position to scan the surface of the sheet P1 or the printed material P2, and reads a front surface image of an object. Specifically, the second scanner 56B scans an image formed on the sheet P1 or an image printed on the printed material P2. As the sheet P1 or the printed material P2 is conveyed, the second scanner 56B scans a color of the image formed on the sheet P1 or the image printed on the printed material P2 in an orthogonal direction orthogonal to a traveling direction of the sheet P1 or the printed material P2, that is, in a main scanning direction.

The controller 501 includes a CPU, a ROM, a RAM, an I/O interface, and the like (not illustrated). The CPU reads a program from the ROM in accordance with processing content, develops the program onto the RAM, and controls an operation of the image scanning apparatus 5 in cooperation with the developed program. The controller 501 controls the inspector 50 in accordance with an operation mode in which a set process is executed. In a case in which the operation mode is a first mode, the controller 501 causes the inspector 50 to detect an image formed on the sheet P1 conveyed from the image former 34 as an object. In a case in which the operation mode is a second mode, the controller 501 causes the inspector 50 to detect an image printed on the printed material P2 conveyed from the feed path 42 as an object. In a case in which the operation mode is the first mode, the controller 501 causes the conveying speed of conveying the object to the inspector 50 to match the conveying speed of the sheet P1 by the image former 34. In a case in which the operation mode is the second mode, the controller 501 causes the conveying speed of conveying the object to the inspector 50 to be slower than the conveying speed of the sheet P1 by the image former 34. For example, the controller 501 may control the conveying speed of conveying the object by controlling the number of revolutions of the conveying roller 52 to be lower than the number of revolutions of the conveying roller 37.

The inspector 50 inspects the object on the basis of inspection image data corresponding to an image in the object scanned by the scanner part 56 and correct image data serving as an inspection reference. The correct image data is different depending on the operation mode, that is, between the first mode and the second mode. In a case in which the operation mode is the first mode, the controller 501 sets data obtained by scanning a first image among images formed on the sheet P1 by the image former 34 on the basis of the original image data by the scanner part 56 as the correct image data. In a case in which the operation mode is the second mode, the controller 501 sets the original image data as the correct image data. The original image data is extracted from data included in the print job, and is data defining information specifying an image to be formed on the sheet P1. Therefore, the controller 501 causes the scanner part 56 to execute an operation of scanning both sides or one side of the object on the basis of the original image data. Specifically, the controller 501 drives both the first scanner 56A and the second scanner 56B when causing the scanner part 56 to execute the operation of scanning both sides of the object. The controller 501 drives one of the first scanner 56A and the second scanner 56B when causing the scanner part 56 to execute the operation of scanning one side of the object.

Further, when the object is inspected by the inspector 50, if a temperature difference between a room temperature and a temperature of an image when scanned by the scanner part 56 is large, a color variation increases due to a thermochromism phenomenon. Therefore, in a case in which the thermochromism phenomenon is assumed, it is desirable to perform thermochromism correction. Specifically, the controller 501 performs the thermochromism correction on the inspection image data scanned by the scanner part 56 on the basis of the ambient temperature detected by the first temperature detector 58 that detects the ambient temperature of the image forming apparatus 1 and the surface temperature detected by the second temperature detector 59 that detects the surface temperature of the object. More specifically, when the difference between the ambient temperature and the surface temperature exceeds a preset temperature range, the controller 501 determines a correction amount by the thermochromism correction. Since the sheet P1 conveyed from the image former 34 passes through the fixer 35, heat is applied to the sheet P1. Therefore, the thermochromism correction is necessary. In other words, in a case in which the operation mode is the first mode, the controller 501 performs the thermochromism correction in accordance with the surface temperature.

Incidentally, if a placement destination of the object inspected differs depending on a result of the inspection process is different, the workability of the user is improved. In other words, it is desirable that a discharge destination to which the object inspected by the inspector 50 is discharged when the operation mode is the first mode or the second mode. In this regard, the discharge destination will be described in detail. The discharging apparatus 6 includes conveyance paths 61a to 61c, a conveying roller 62, a purge tray 64, and a controller 601. The conveyance paths 61a to 61c are referred to collectively as a conveyance path 61. The purge tray 64 is installed in an upper portion of the discharging apparatus 6 and serves as the discharge destination of the sheet P1 or the printed material P2 conveyed by the conveyance path 61c. The conveyance path 61a conveys the sheet P1 or the printed material P2 conveyed from the image scanning apparatus 5 to the discharging apparatus 7 as the conveying roller 62 is driven. The conveyance path 61b conveys the sheet P1 or the printed material P2 conveyed from the image scanning apparatus 5 to the conveyance path 61c as the conveying roller 62 is driven. The conveyance path 61c conveys the sheet P1 or printed material P2 conveyed from the conveyance path 61b to the purge tray 64 as the conveying roller 62 is driven. The controller 601 includes a CPU, a ROM, a RAM, an I/O interface, and the like (not illustrated). The CPU reads a program from the ROM in accordance with processing content, develops the program onto the RAM, and controls an operation of the discharging apparatus 6 in cooperation with the developed program.

The discharging apparatus 7 includes discharging path 71, discharging roller 72, driver 73, main tray 74_1, main tray 74_2, and controller 701. The main tray 74_1 and the main tray 74_2 are referred to collectively as a main tray 74. The main tray 74_1 and the main tray 74_2 are vertically movable by the driver 73, and are discharge destinations of the sheet P1 or the printed material P2 conveyed by the discharging path 71. The discharging path 71 discharges the sheet P1 or the printed material P2 conveyed from the discharging apparatus 6 to the main tray 74 as the discharging roller 72 is driven. The controller 701 includes a CPU, a ROM, a RAM, an I/O interface, and the like (not illustrated). The CPU reads a program from the ROM in accordance with processing content, develops the program onto the RAM, and controls an operation of the discharging apparatus 7 in cooperation with the developed program.

In other words, a plurality of discharge destinations to which the object inspected by the inspector 50 is discharged are constituted by the discharging apparatus 6 and the discharging apparatus 7. In this regard, the inspector 50 discharges an object whose inspection result is the waste sheet P_F among objects to some of a plurality of discharge destinations. The inspector 50 causes the object whose inspection result is the normal sheet P_T to the remaining destinations among the plurality of discharge destinations. For example, the waste sheet P_F can be discharged to the purge tray 64. Further, the normal sheet P_T can be discharged to the main tray 74.

Figure 2:
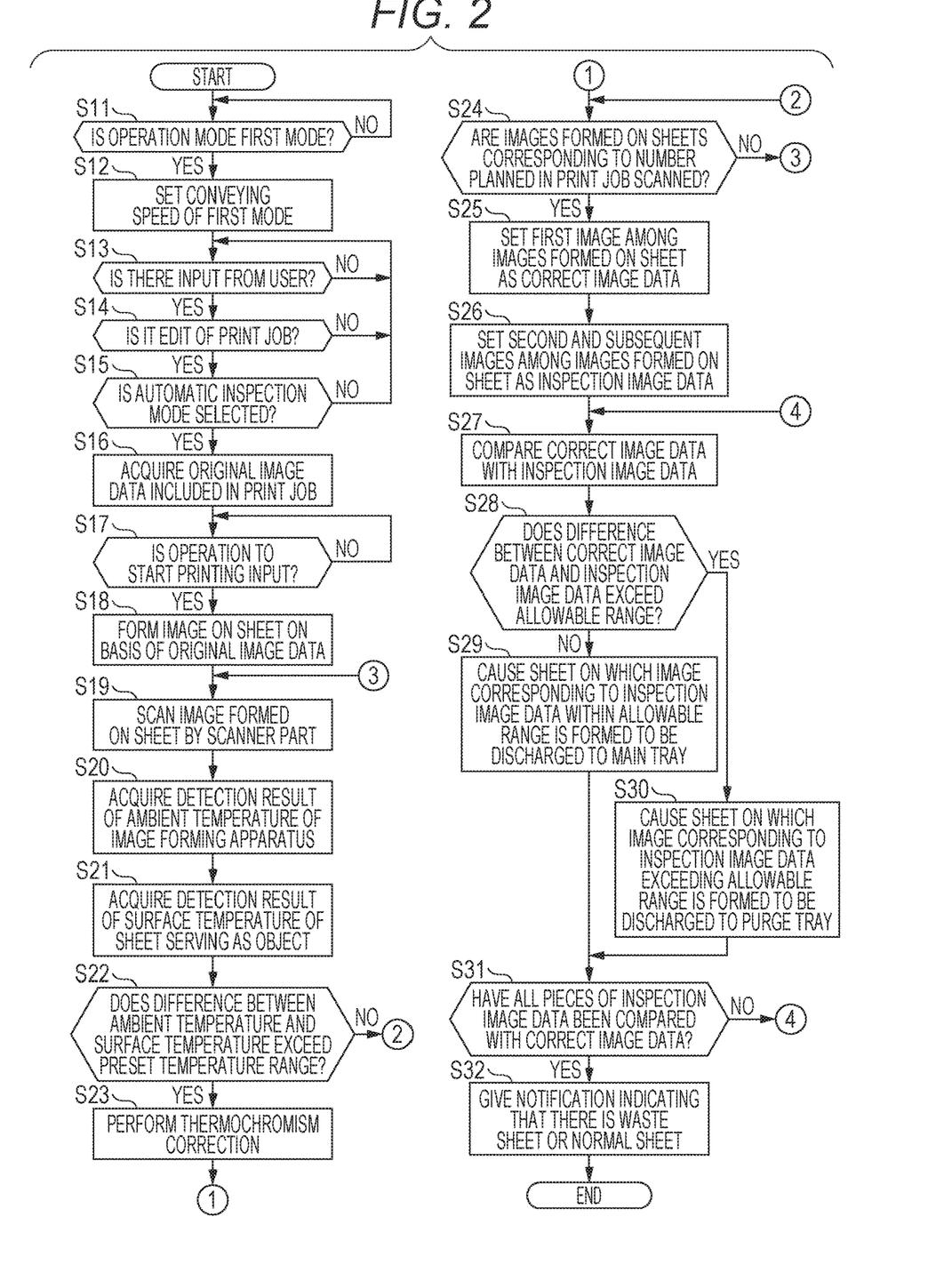
FIG. 2 is a flowchart illustrating an example of an inspection process when an operation mode according to an embodiment of the present disclosure is a first mode.

Further, each of the controller 201, the controller 301, the controller 401, the controller 501, the controller 601, and the controller 701 controls the operation of the image forming apparatus 1. Therefore, as will be described below in detail, in the inspection process to be specifically described below, in addition to the controller 501, any one of the controller 201, the controller 301, the controller 401, the controller 601, and the controller 701 may be a main control entity. FIG. 2 is a flowchart illustrating an example of the inspection process when the operation mode according to an embodiment of the present disclosure is the first mode. In step S11, the controller 501 determines whether or not the operation mode is the first mode. When the controller 501 determines that the operation mode is the first mode (Y in step S11), the process proceeds to step S12. When it is determined that the operation mode is not the first mode (N in step S11), the controller 501 continues the process of step S11. In step S12, the controller 501 sets the conveying speed of the first mode. The conveying speed of the first mode is a speed matching the conveying speed of the image former 34. In step S13, the controller 501 determines whether or not there is an input from the user. For example, it may be determined whether or not there is an input from the user via the operating unit 36b. When the controller 501 determines that there is an input from the user (Y in step S13), the process proceeds to step S14. When the controller 501 determines that there is no input from the user (N in step S13), the controller 501 continues the process of step S13. In step S14, the controller 501 determines whether or not it is an edit of a print job. When the controller 501 determines that it is an edit of a print job (Y in step S14), the process proceeds to step S15. When the controller 501 determines that it is not an edit of a print job (N in step S14), the process returns to step S13.

In step S15, the controller 501 determines whether or not an automatic inspection mode is selected. When the controller 501 determines that the automatic inspection mode is selected (Y in step S15), the process proceeds to step S16. When the controller 501 determines that the automatic inspection mode is not selected (N in step S15), the process returns to step S13. In step S16, the controller 501 acquires the original image data included in the print job. In step S17, the controller 501 determines whether or not an operation to start printing is input. For example, it may be determined whether or not a print start button is operated by the user via the operating unit 36b. When the controller 501 determines that an operation to start printing is input (Y in step S17), the process proceeds to step S18. When the controller 501 determines that an operation to start printing is not input (N in step S17), the controller 501 continues the process of step S17. In step S18, the image former 34 forms an image on the sheet P1 on the basis of the original image data. In step S19, the inspector 50 scans the image formed on the sheet P1 by the scanner part 56. In step S20, the controller 501 acquires a detection result of the ambient temperature of the image forming apparatus 1. In step S21, the controller 501 acquires a detection result of the surface temperature of the sheet P1 which is the object. In step S22, the controller 501 determines whether or not the difference between the ambient temperature and the surface temperature exceeds a preset temperature range. When the controller 501 determines that the difference between the ambient temperature and the surface temperature exceeds the preset temperature range (Y in step S22), the process proceeds to step S23. When the controller 501 determines that the difference between the ambient temperature and the surface temperature does not exceed the preset temperature range (N in step S22), the process proceeds to step S24. In step S23, the controller 501 performs the thermochromism correction.

In step S24, the controller 501 determines whether or not the images formed on the sheets P1 corresponding to a number planned in the print job are scanned. When the controller 501 determines that the images formed on the sheets P1 corresponding to a number planned in the print job are scanned (Y in step S24), the process proceeds to step S25. When the controller 501 determines that the images formed on the sheets P1 corresponding to a number planned in the print job are not scanned (N in step S24), the process returns to step S19. In step S25, the controller 501 sets a first image among the images formed on the sheet P1 as the correct image data. In step S26, the controller 501 sets second and subsequent images among the images formed on the sheet P1 as the inspection image data. In step S27, the controller 501 compares the correct image data with the inspection image data. In step S28, the controller 501 determines whether or not the difference between the correct image data and the inspection image data exceeds an allowable range. When the controller 501 determines that the difference between the correct image data and the inspection image data exceeds the allowable range (Y in step S28), the process proceeds to step S30. In step S30, the controller 501 causes the sheet P1 on which the image corresponding to the inspection image data exceeding the allowable range is formed to be discharged to the purge tray 64, and the process proceeds to step S31. When the controller 501 determines that the difference between the correct image data and the inspection image data does not exceed the allowable range (N in step S28), the process proceeds to step S29. In step S29, the controller 501 causes the sheet P1 on which the image corresponding to the inspection image data within the allowable range is formed to be discharged to the main tray 74, and the process proceeds to step S31. In step S31, the controller 501 determines whether or not all pieces of inspection image data have been compared with the correct image data. When the controller 501 determines that all pieces of inspection image data have been compared with the correct image data (Y in step S31), the process proceeds to step S32. When the controller 501 determines that there is any one piece of inspection image data which has not been compared with the correct image data (N in step S31), the process returns to step S27. In step S32, the controller 501 gives a notification indicating that there is a waste sheet P_F or a normal sheet P_T, and ends the inspection process. For example, although not described in the flowchart, a main tray flag is set to 1 when the sheet P1 or the printed material P2 is discharged to the main tray 74, and a purge tray flag is set to 1 when the sheet P1 or the printed material P2 is discharged to the purge tray 64. Since the normal sheet P_T is discharged to the main tray 74, if the main tray flag is 1, it is desirable to give a notification indicating that there is a normal sheet P_T. On the other hand, since the waste sheet P_F is discharged to the purge tray 64, if the purge tray flag is 1, it is desirable to give a notification indicating that there is a waste sheet P_F.

Figure 3:
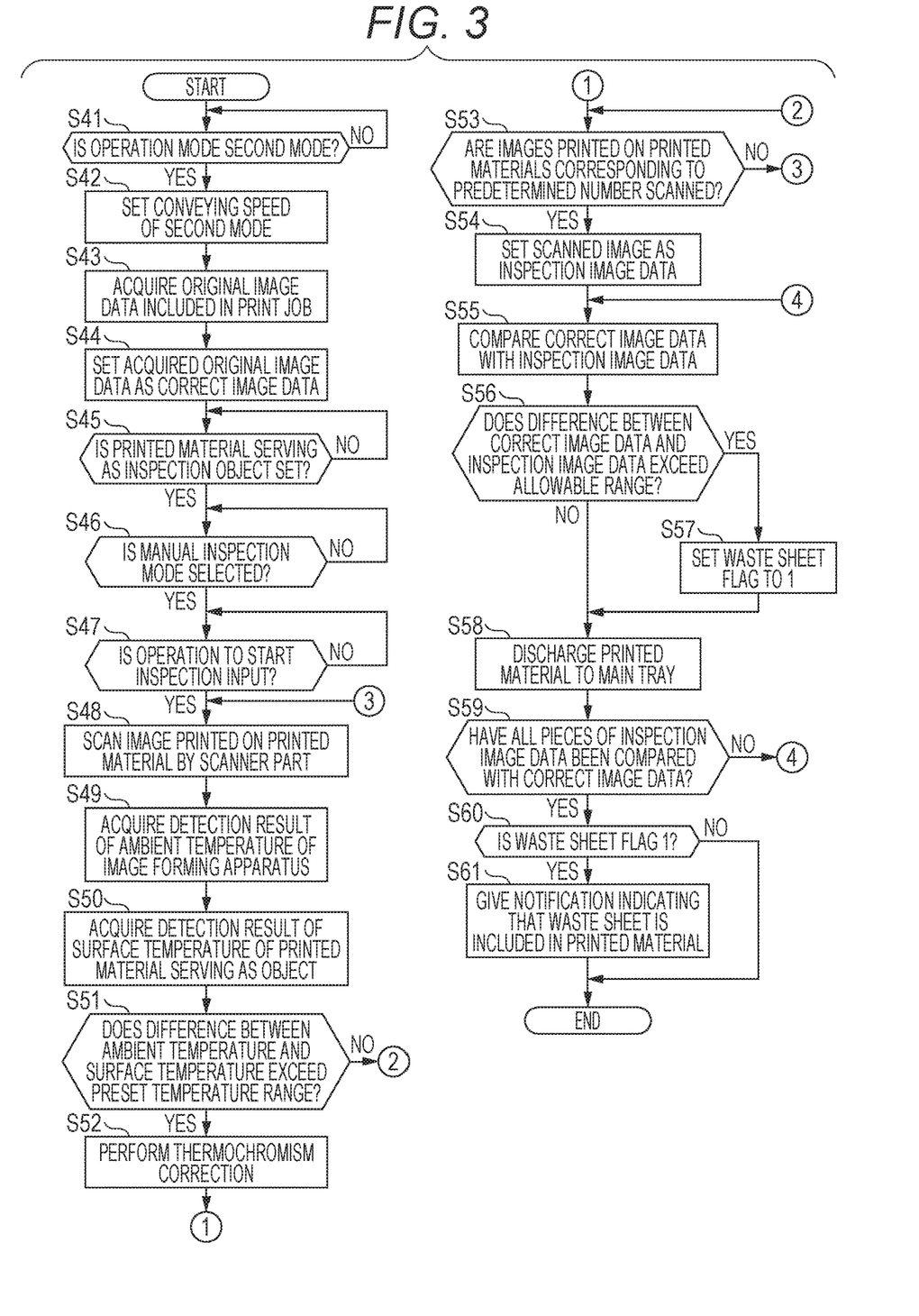
FIG. 3 is a flowchart illustrating an example of an inspection process when an operation mode according to an embodiment of the present disclosure is a second mode.

FIG. 3 is a flowchart illustrating an example of the inspection process when the operation mode according to an embodiment of the present disclosure is the second mode. Further, description of a process similar to the process described with reference to FIG. 2 will be omitted. Specifically, since a process of step S48 to step S52 is similar to the process of step S19 to step S23, description thereof is omitted. In step S41, the controller 501 determines whether or not the operation mode is the second mode. When the controller 501 determines that the operation mode is the second mode (Y in step S41), the process proceeds to step S42. When it is determined that the operation mode is not the second mode (N in step S41), the controller 501 continues the process of step S41. In step S42, the controller 501 sets the conveying speed in the second mode. The conveying speed of the second mode is a speed slower than the conveying speed of the image former 34. In step S43, the controller 501 acquires the original image data included in the print job. In step S44, the controller 501 sets the acquired original image data as the correct image data. In step S45, the controller 501 determines whether or not the printed material P2 serving as an inspection object is set. When the controller 501 determines that the printed material P2 serving as the inspection object is set (Y in step S45), the process proceeds to step S46. When the controller 501 determines that the printed material P2 serving as the inspection object is not set (N in step S45), the controller 501 continues the process of step S45. In step S46, the controller 501 determines whether or not a manual inspection mode is selected. When the controller 501 determines that the manual inspection mode is selected (Y in step S46), the process proceeds to step S47. When the controller 501 determines that the manual inspection mode is not selected (N in step S46), the controller 501 continues the process of step S46.

In step S47, the controller 501 determines whether or not an operation to start the inspection is input. For example, it may be determined whether or not an inspection start button is operated by the user via the operating unit 36b. When the controller 501 determines that the operation to start the inspection is input (Y in step S47), the process proceeds to step S48. When the controller 501 determines that the operation to start the inspection is not input (N in step S47), the controller 501 continues the process of step S47. In step S53, the controller 501 determines whether or not the images printed on the printed materials P2 corresponding to a predetermined number are scanned. When the controller 501 determines that the images printed on the printed materials P2 corresponding to a predetermined number are scanned (Y in step S53), the process proceeds to step S54. When the controller 501 determines that the images printed on the printed materials P2 corresponding to a predetermined number are not scanned (N in step S53), the process returns to step S48. In step S54, the controller 501 sets the scanned images as the inspection image data. In step S55, the controller 501 compares the correct image data with the inspection image data. In step S56, the controller 501 determines whether or not the difference between the correct image data and the inspection image data exceeds an allowable range. When the controller 501 determines that the difference between the correct image data and the inspection image data exceeds the allowable range (Y in step S56), the process proceeds to step S57. In step S57, the controller 501 sets the waste sheet flag to 1 and proceeds to a process of step S58. When the controller 501 determines that the difference between the correct image data and the inspection image data does not exceed the allowable range (N in step S56), the process proceeds to step S58. In step S58, the controller 501 discharges the printed material P2 to the main tray 74, and the process proceeds to step S59. In step S59, the controller 501 determines whether or not all pieces of inspection image data have been compared with the correct image data. When the controller 501 determines that all pieces of inspection image data have been compared with the correct image data (Y in step S59), the process proceeds to step S60. When the controller 501 determines that there is any one pieces of inspection image data which is not compared with the correct image data (N in step S59), the process returns to step S55. In step S60, the controller 501 determines whether or not the waste sheet flag is 1. When the controller 501 determines that the waste sheet flag is 1 (Y in step S60), the process proceeds to step S61, and in step S61, the controller 501 gives a notification indicating that the printed material P2 includes the waste sheet P_F and ends the inspection process. When the controller 501 determines that the waste sheet flag is not 1 (N in step S60), the controller 501 ends the inspection process. Incidentally, a notification indicating that there is waste sheet P_F or a normal sheet P_T may be given regardless of the waste sheet flag.

Figure 4:
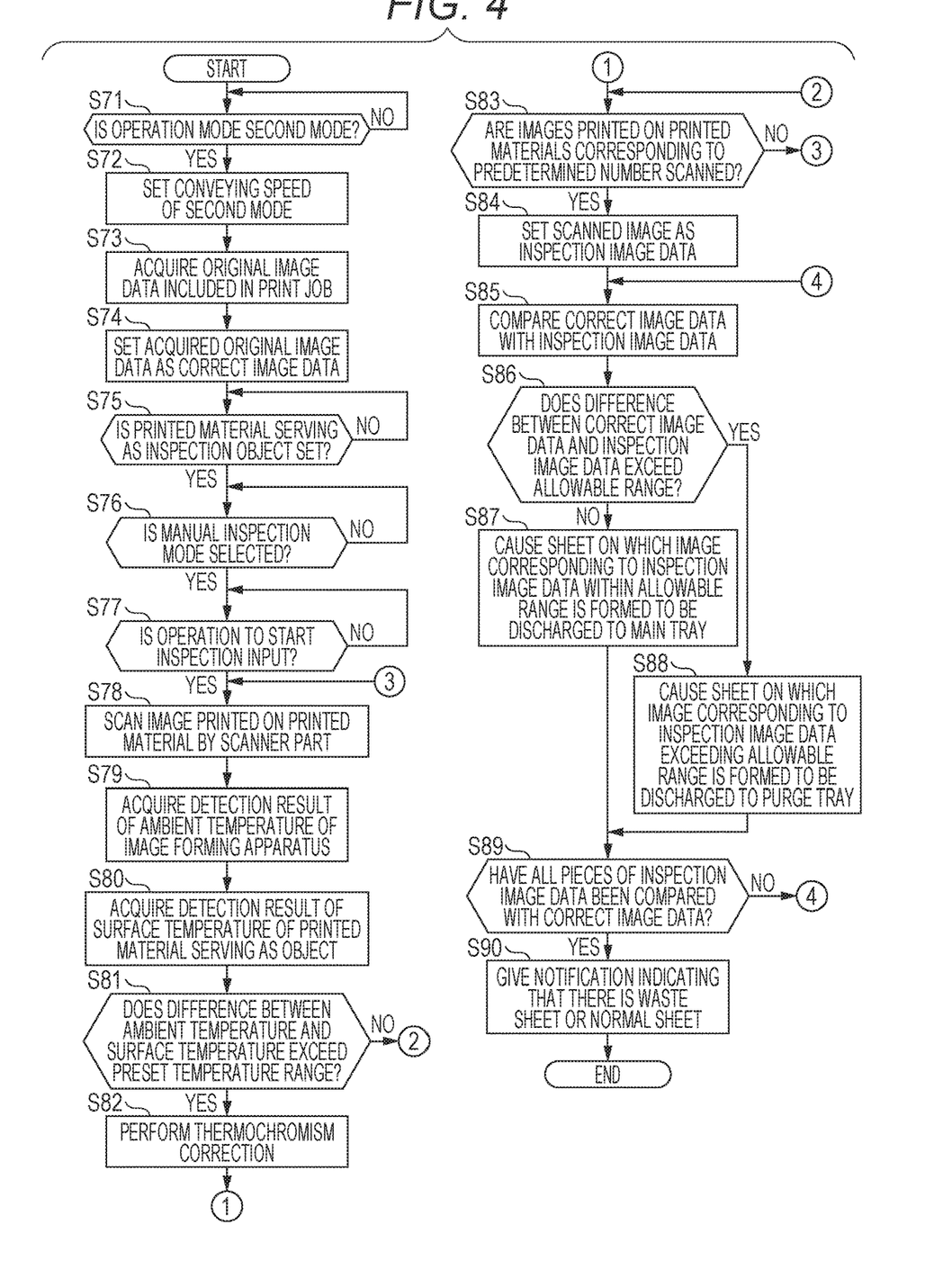
FIG. 4 is a flowchart illustrating another example of an inspection process when an operation mode according to an embodiment of the present disclosure is a second mode.

FIG. 4 is a flowchart illustrating another example of the inspection process when the operation mode according to an embodiment of the present disclosure is the second mode. A processing to be described with reference to FIG. 4 includes a combination of the processes described with reference to FIGS. 2 and 3. Specifically, a process of step S71 to step S85 is similar to the process of step S41 to step S55. A process of step S86 to step S90 is similar to the process of step S28 to step S32. In other words, the process of step S11 to step S26 is a process of setting the correct image data and the inspection image data when the operation mode is the first mode. The process of step S27 to step S32 is a process in a case in which there are two detection result discharge destinations. The process of step S41 to step S54 and the process of step S71 to step S84 are processes of setting the correct image data and the inspection image data when the operation mode is the second mode. The process of step S55 to step S61 is a process in a case in which there is only one detection result discharge destination. The process of step S85 to step S90 is a process in a case in which there are two detection result discharge destinations.

From the above description, in the present embodiment, the feed path 42 is used to convey the object to the inspector 50, and the feed path 42 is formed to bypass the image former 34. Therefore, since the object is not conveyed to the inspector 50 via the image former 34, the object is unlikely to get dirty by the image former 34. Therefore, it is possible to perform the inspection while maintaining the quality of the printed material P2.

In the present embodiment, when the operation mode is the first mode, the image formed on the sheet P1 conveyed from the image former 34 is inspected by the inspector 50 as the object. When the operation mode is the second mode, the image printed on the printed material P2 conveyed from the feed path 42 is inspected by the inspector 50 as the object. Therefore, it is possible to switch the path of the object conveyed to the inspector 50 depending on the operation mode. Therefore, the quality of the object can be maintained by controlling the operation mode.

In the present embodiment, when the operation mode is the first mode, the conveying speed for conveying the object to the inspector 50 is matched with the conveying speed of the sheet P1 by the image former 34, and when the operation mode is the second mode, the conveying speed for conveying the object to inspector 50 is slower than the conveying speed of sheet P1 by the image former 34. When it is the conveying speed matched with the conveying speed of the sheet P1 by image former 34, a leading end portion or an image surface of the object is susceptible to damage. For example, if the object is a thin sheet, the leading end portion of the object is likely to be folded. When the object is a cardboard, the image surface of the object is likely to be scratched. In the present embodiment, when the operation mode is the second mode, the object is conveyed at the conveying speed slower than the conveying speed of the sheet P1 by the image former 34. Therefore, the leading end portion or the image surface of the object is not damaged. Therefore, the object can be conveyed to the inspector 50 while maintaining the quality of the object.

In the present embodiment, the object is inspected on the basis of the inspection image data corresponding to the image in the object scanned by the scanner part 56 and the correct image data. Therefore, it is possible to extract the difference between the correct image data and the inspection image data. Therefore, it is possible to determine whether or not the object is the waste sheet P_F in accordance with the extracted difference.

In the present embodiment, when the operation mode is the first mode, the data obtained by scanning the first image among the images formed on the sheet P1 by the image former 34 on the basis of the original image data the scanner part 56 is set as the correct image data, and when the operation mode is the second mode, the original image data is set as the correct image data. Therefore, regardless of the first mode or the second mode, since there is the correct image data, it can be determined whether or not the object is the waste sheet P_F.

Further, in the present embodiment, the scanner part 56 executes the operation of scanning both sides or one side of the object on the basis of the original image data. Therefore, when it is determined that both sides of the object are printed on the basis of the original image data, both sides of the object are scanned by the scanner part 56. When it is determined that one side of the object is printed on the basis of the original image data, one side of the object is scanned by the scanner part 56. Therefore, since only the surface serving as the inspection target can be scanned, the cost for generating the inspection image data can be reduced.

Further, in the present embodiment, when the operation of scanning both sides of the object is executed, both the first scanner 56A and the second scanner 56B are driven. When the operation of scanning one side of the object is executed, either the first scanner 56A or the second scanner 56B is driven. Therefore, since only the necessary scanner out of the first scanner 56A and the second scanner 56B can be driven, the power consumption of the inspection process can be reduced.

Further, in the present embodiment, the thermochromism correction of the inspection image data scanned by the scanner part 56 is performed on the basis of the ambient temperature detected by the first temperature detector 58 and the surface temperature detected by the second temperature detector 59. Therefore, even though the image color of the object greatly varies due to the thermochromism phenomenon since the difference between the ambient temperature and the surface temperature is large, since the thermochromism correction is performed, the inspection image data can be corrected to a correct value. Therefore, the accuracy of the inspection process can be improved.

Further, in the present embodiment, when the difference between the ambient temperature and the surface temperature exceeds a preset temperature range, the correction amount by the thermochromism correction is decided. Therefore, if it is a state in which the image color of the object greatly varies due to the thermochromism phenomenon, since the thermochromism correction is performed, the inspection image data can be corrected to a correct value. Therefore, the accuracy of the inspection process can be improved.

Further, in the present embodiment, when the operation mode is the first mode, the thermochromism is performed in accordance with the surface temperature. Therefore, even though the heat is applied to the object by the image former 34, since the thermochromism correction is performed, the inspection image data can be corrected to a correct value. Therefore, the accuracy of the inspection process can be improved.

Further, in the present embodiment, the discharge destination to which the object inspected by the inspector 50 in the first mode or the second mode is set. Therefore, since the inspection result is discharged to the discharge destination, the user can go to the discharge destination to take the inspection result, and it is possible to improve the workability of the user.

In the present embodiment, the object whose inspection result is the waste sheet P_F among the objects are discharged to some of a plurality of discharge destinations, and the object whose inspection result is the normal sheet P_T are discharged to the remaining discharge destination among the plurality of discharge destinations. Therefore, since the discharge destination of the waste sheet P_F and the discharge destination of the normal sheet P_T are separated, the user can go to take the inspection result in accordance with the inspection content, and thus the workability of the user can be improved.

Although the image forming apparatus 1 according to the present disclosure has been described above on the basis of the embodiment, the present disclosure is not limited thereto, and modifications may be made without departing from the gist of the present disclosure.

For example, in the present embodiment, the example of discharging the waste sheet P_F to the purge tray 64 has been described, but the present disclosure is not particularly limited thereto. For example, the waste sheet P_F may be discharged to the main tray 74_2. Further, although the example in which the feed path 42 is installed in the paper inserter 4 has been described, the present disclosure is not particularly limited thereto. The feed path 42 may be installed inside the image forming apparatus main body 3 as long as the feed path 42 is installed to bypass the image former 34.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image forming apparatus, comprising:
   an image former configured to print an image on a sheet that is conveyed on a conveyance path through the image former;
   an inspector configured to inspect the image on the sheet, the inspector being positioned on the conveyance path to receive the sheet on which the image is printed by the image former; and
   a sheet inserter configured to insert a sheet into the image forming apparatus and onto a bypass feed path that conveys the inserted sheet to the inspector without passing the sheet through the image former.

2. The image forming apparatus according to claim 1, further comprising a hardware processor that controls the inspector in accordance with an operation mode,
   wherein:
   when the operation mode is a first mode, the hardware processor causes the inspector to inspect the image printed on the sheet conveyed from the image former, and
   when the operation mode is a second mode, the hardware processor causes the inspector to inspect an image printed on the inserted sheet conveyed on the bypass feed path to the inspector.

3. The image forming apparatus according to claim 2, wherein:
   when the operation mode is the first mode, the hardware processor causes a conveying speed for conveying the sheet to the inspector to match a conveying speed of the sheet by the image former, and
   when the operation mode is the second mode, the hardware processor causes a conveying speed for conveying the inserted sheet to the inspector to be slower than the conveying speed of the sheet by the image former.

4. The image forming apparatus according to claim 2, further comprising a discharge destination to which the sheet inspected by the inspector in the first mode or the second mode is discharged.

5. The image forming apparatus according to claim 2, further comprising a plurality of discharge destinations to which the sheet inspected by the inspector is discharged,
   wherein the inspector causes sheets whose inspection result indicates a waste sheet to be discharged to at least one of the plurality of discharge destinations and causes sheets whose inspection result indicates a normal sheet to be discharged to at least one different discharge destination among the plurality of discharge destinations.

6. The image forming apparatus according to claim 2, wherein the inspector comprises a scanner, and
   wherein the inspector inspects the image printed on the sheet conveyed from the image former or the image printed on the inserted sheet based on inspection image data obtained by the scanner part and correct image data serving as an inspection reference.

7. The image forming apparatus according to claim 6, wherein:
   when the operation mode is the first mode, the hardware processor sets data obtained by scanning, by the scanner, a first image among images printed on sheets by the image former based on original image data as the correct image data, and when the operation mode is the second mode, the hardware processor sets the original image data as the correct image data.

8. The image forming apparatus according to claim 7, wherein the hardware processor causes the scanner to execute an operation of scanning both sides of the sheet or an operation of scanning one side of the sheet based on the original image data.

9. The image forming apparatus according to claim 7, wherein the scanner comprises:
   a first scanner that scans a back surface of the sheet; and
   a second scanner that scans a front surface of the sheet, and
   wherein the hardware processor causes both of the first scanner and the second scanner to be driven when an operation of scanning both sides of the sheet is executed, and causes one of the first scanner and the second scanner to be driven when an operation of scanning one side of the sheet is executed.

10. The image forming apparatus according to claim 7, further comprising:
   a first temperature detector that detects an ambient temperature of the image forming apparatus; and
   a second temperature detector that detects a surface temperature of the sheet,
   wherein the hardware processor performs thermochromism correction of the inspection image data obtained by the scanner based on the ambient temperature detected by the first temperature detector and the surface temperature detected by the second temperature detector.

11. The image forming apparatus according to claim 10, wherein the hardware processor determines a correction amount for the thermochromism correction when a difference between the ambient temperature and the surface temperature exceeds a preset temperature range.

12. The image forming apparatus according to claim 10, wherein the hardware processor performs the thermochromism correction in accordance with the surface temperature when the operation mode is the first mode.

* * * * *